United States Patent [19]
Yamamoto et al.

[11] Patent Number: 5,764,536
[45] Date of Patent: Jun. 9, 1998

[54] METHOD AND DEVICE TO ESTABLISH VIEWING ZONES AND TO INSPECT PRODUCTS USING VIEWING ZONES

[75] Inventors: Norihito Yamamoto, Shiga; Yukiya Sawanoi, Nara; Koichi Tanaka, Kyoto, all of Japan

[73] Assignee: OMRON Corporation, Kyoto, Japan

[21] Appl. No.: 574,692

[22] Filed: Dec. 19, 1995

[30] Foreign Application Priority Data

Dec. 19, 1994 [JP] Japan .................................. 6-334945
Oct. 30, 1995 [JP] Japan .................................. 7-306874

[51] Int. Cl.⁶ .................................................. G06K 9/00
[52] U.S. Cl. ...................... 364/550; 348/87; 348/126; 382/147; 382/148
[58] Field of Search .......................... 364/550, 551.01, 364/552; 348/126, 79, 87; 382/147, 148

[56] References Cited

U.S. PATENT DOCUMENTS

| | | | |
|---|---|---|---|
| 4,958,374 | 9/1990 | Tokita et al. ........................ | 382/8 |
| 5,023,916 | 6/1991 | Breu ................................... | 382/8 |
| 5,127,726 | 7/1992 | Moran ................................. | 356/237 |
| 5,134,575 | 7/1992 | Takagi ................................. | 364/552 |
| 5,245,421 | 9/1993 | Robertson et al. ................... | 358/101 |
| 5,455,870 | 10/1995 | Sepai et al. ......................... | 382/147 |
| 5,517,235 | 5/1996 | Wasserman ......................... | 348/126 |

FOREIGN PATENT DOCUMENTS 0 413 817 A1  2/1991  European Pat. Off. .

*Primary Examiner*—James P. Trammell
*Assistant Examiner*—Patrick Assouad
*Attorney, Agent, or Firm*—Morrison & Foerster LLP

[57] ABSTRACT

In a device used to inspect substrates visually, an imaging region and a magnification are specified ahead of time for every component and stored as library data in a memory. The memory also contains CAD data, which include the class of each component on the substrate and its location. During initialization, a control unit links the location data for a component extracted from the CAD data to corresponding library data and specifies a field of view and a magnification for every component on the substrate. Using this data, the control unit creates on the substrate a number of viewing zones to be inspected at various magnifications and stores the data specifying these zones in the memory. When a substrate is to be inspected, the control unit uses the data specifying these zones to control the position and magnification of an imaging unit to collect image data from each zone successively and display them on a monitor.

36 Claims, 18 Drawing Sheets

FIG. 5

| COMPONENT | PART NUMBER | LOCATION | | ORIENTATION |
|---|---|---|---|---|
| C01 | CH001 | $X_1$ | $Y_1$ | $\theta_1$ |
| C02 | CH001 | $X_2$ | $Y_2$ | $\theta_2$ |
| C03 | CH002 | $X_3$ | $Y_3$ | $\theta_3$ |
| TR01 | TR001 | $X_4$ | $Y_4$ | $\theta_4$ |
| TR02 | TR002 | $X_5$ | $Y_5$ | $\theta_5$ |
| ⋮ | ⋮ | ⋮ | ⋮ | ⋮ |

| PART NUMBER | CLASS | VARIANT |
|---|---|---|
| CH001 | $C_1$ | VAR1 |
| CH002 | $C_1$ | VAR2 |
| ⋮ | ⋮ | ⋮ |
| TR001 | $TR_1$ | VAR1 |
| TR002 | $TR_2$ | VAR1 |
| ⋮ | ⋮ | ⋮ |

| CLASS | VARIANT | DATA CREATING FIELD OF VIEW | DATA CREATING POINTER | MAGNIFICATION |
|---|---|---|---|---|
| C1 | VAR1 | r1<br>r2 | p1<br>p2 | 1.0<br>1.0 |
| C1 | VAR2 | r3<br>r4 | p3<br>p4 | 2.0<br>2.0 |
| ... | ... | ..... | ..... | ..... |

27

METHOD AND DEVICE TO ESTABLISH VIEWING ZONES AND TO INSPECT PRODUCTS USING VIEWING ZONES

BACKGROUND OF THE INVENTION

The invention is directed, in general, to establishing viewing zones for use in inspecting the attachment of components arranged on the surface of an object. For example, it is often useful to inspect the soldered portion of electronic components mounted on a printed circuit board. Inspection devices have been developed for this purpose. These devices produce an image of the object (i.e., the printed circuit board) that is then used to evaluate the attachment of each component either by visual or automatic inspection.

The inspection devices establish multiple viewing zones on the object, or substrate, prior to inspection. Thereafter, an imaging device is moved successively to each viewing zone and an image is captured for each zone. For a visual inspection, the images that have been captured for the viewing zones are displayed on a monitor and evaluated by an inspector. For an automatic inspection, a control unit extracts the image data representing the portion of the zone to be inspected and compares the extracted data with previously recorded data to evaluate the mounting of each component.

A viewing zone of the type described above is established for every location on the substrate where a component is mounted. Prior to the inspection, a control unit in the inspection device is provided with position data for each component, using either images that have been obtained by imaging a substrate on which all of the components are correctly mounted or computer-aided-design ("CAD") data created during the process of designing the substrate. The position data are generally in the form of coordinates of specific reference points such as the center point of each component.

FIG. 22A shows an example of the process used to establish a viewing zone. An imaging region R, which corresponds to the field of view of the imaging device, is specified in the image data representing an acceptable substrate or in the CAD data. The imaging region R is then scanned successively through the data.

FIG. 22B shows an example of how components might be arranged within the imaging region R. In this drawing, a verification region 50 is used to judge whether a component is retained within imaging region R. Verification region 50 is specified by its borders, which lie a distance d inside imaging region R. The control unit determines that a component lies within imaging region R if a center point x of the component is within the verification region 50.

The control unit scans imaging region R successively over the substrate, while at the same time checking the positions and the total number of center points within the verification region 50. A verification region 50 containing center points of one or more components fixes the position of an imaging region R. The imaging region defined by this process is stored in the memory as a viewing zone. When the center point of every component on the substrate is contained in a viewing zone, the process of establishing the viewing zones is completed.

In the example shown in the FIG. 22B, the center points of four components (51, 52, 53 and 54) are contained in verification region 50. At this point the control unit would define the position of an imaging region R. The location and size of this region R would be stored, and the components 51, 52, 53 and 54 would be identified as the items to be inspected in the viewing zone.

SUMMARY OF THE INVENTION

Because the coordinates of the reference point indicating the location of each component and the location of the portion of the component which is to be inspected do not necessarily coincide, it sometimes happens that even though a component's reference point lies within the viewing zone, the portion to be inspected does not. For example, when the viewing zone is drawn as shown in FIG. 22B, the portions 55 of components 51 and 52 that are to be inspected lie within the viewing zone. It is thus possible to inspect these components using the viewing zone. Some of the portions 56 to be inspected on components 53 and 54, however, lie outside the viewing zone, and cannot be inspected using the viewing zone.

To obviate this problem, each viewing zone must be checked after the zones are established. If any portion of a component that is to be inspected is not in the viewing zone where that component is located, the location of the viewing zone must be corrected or the set of zones must be redrawn so that all portions of components to be inspected are positioned in some viewing zone. Significant time and effort is required to check each viewing zone. In addition, the efficiency of inspection decreases as the number of zones increases.

The invention permits viewing zones to be established properly and efficiently. Data that were previously established for each class of component arranged on a substrate and that identify the field of view needed to inspect each class of component are used in establishing the viewing zones.

The efficiency and accuracy of the inspection is also improved by using a predefined magnification value for each class of component to set the desired magnification for every component on the substrate. Thereafter, the optimal magnification is set for each component by establishing the viewing zones using data encoding the field of view and the desired magnification for the component.

In one aspect, generally, the invention features a method of establishing viewing zones for use in inspecting the attachment of components arranged on the surface of an object. First, fields of view for each component on the object are defined by combining data representing the location of the component on the object with data identifying the field of view for the class of component to which the component belongs. Second, viewing zones are created on the surface of the object using the fields of view that have been defined.

In another aspect, generally, the invention features a method of establishing viewing zones in which fields of view are defined by combining, for each component on the object, data representing the location of that component on the object with data concerning the field of view and the magnification to be used for the class of components to which that component belongs. Thereafter, viewing zones are created on the surface of the object using the field of view and the magnifications which have been defined.

The invention also features a device that implements the methods for establishing viewing zones. The device may include a memory that records data concerning a field of view needed to inspect each of a number of classes of components, an input device that supplies data representing the class of each component on the object and its location on the object, and a controller that receives data from the input device, combines this data with the data from the memory to define a field of view for each component on the object, and uses the fields of view to establish viewing zones on the object.

According to the invention, a number of viewing zones may be established for the purpose of inspecting the attachment of each component on an object having multiple components positioned on it. Data representing the location of each component on the object are linked to data defining a field of view which were previously recorded for the relevant class of component. In this way, a field of view is defined for every component on the object. Because these fields of view are used to create viewing zones, the portions of each component that are to be inspected will necessarily be assigned to one of the viewing zones created, and no processing will be needed to modify or enlarge a viewing zone. This improves the efficiency of the processing involved in setting up the viewing zones. Also, since the correct number of zones is created for inspection, the efficiency of the inspection itself is substantially enhanced.

Data representing the location of each component on the object may be linked to data representing the field of view and the magnification which have been specified for the class to which that component belongs. In this way the appropriate field of view can be specified according to the location of the component, and a magnification appropriate for that class of component can be specified. These data can then be used to create viewing zones. During inspection of an object, or substrate, the position of the imaging device and its magnification can be controlled according to the data specified for each viewing zone. Optimal image data are obtained for each component, and efficiency and accuracy are substantially enhanced.

Design data originally created to arrange each component on the object may be entered to specify the class to which each component belongs and its relative location on the object. Also, design data may be entered to identify each component and specify its relative location on the object. Use of design data allows data input to be executed accurately and swiftly, which in turn allows viewing zones to be created accurately and swiftly.

The location of each viewing zone is adjusted so that the center point of the viewing zone matches the center point of a rectangular region which includes every field of view that lies within the zone. This causes all fields of view to be placed in a viewing zone in a balanced fashion and guarantees that the display screen will be easy to read during inspection.

Marks which serve to identify the location of each item to be inspected in a viewing zone may be displayed along with the image data representing that zone. When the substrate is to be inspected visually, this arrangement allows the inspector to verify the locations to be inspected, which results in higher accuracy and efficiency.

Other features and advantages of the invention will become clear from the following detailed description of the preferred embodiments, from the drawings, and from the claims.

BRIEF DESCRIPTION OF THE DRAWING

FIG. 5 illustrates data in a CAD data file.

FIG. 6 illustrates data in a data file providing part number correspondence.

FIG. 7 illustrates data in a library data file.

DESCRIPTION OF THE PREFERRED EMBODIMENTS

Figure 1:
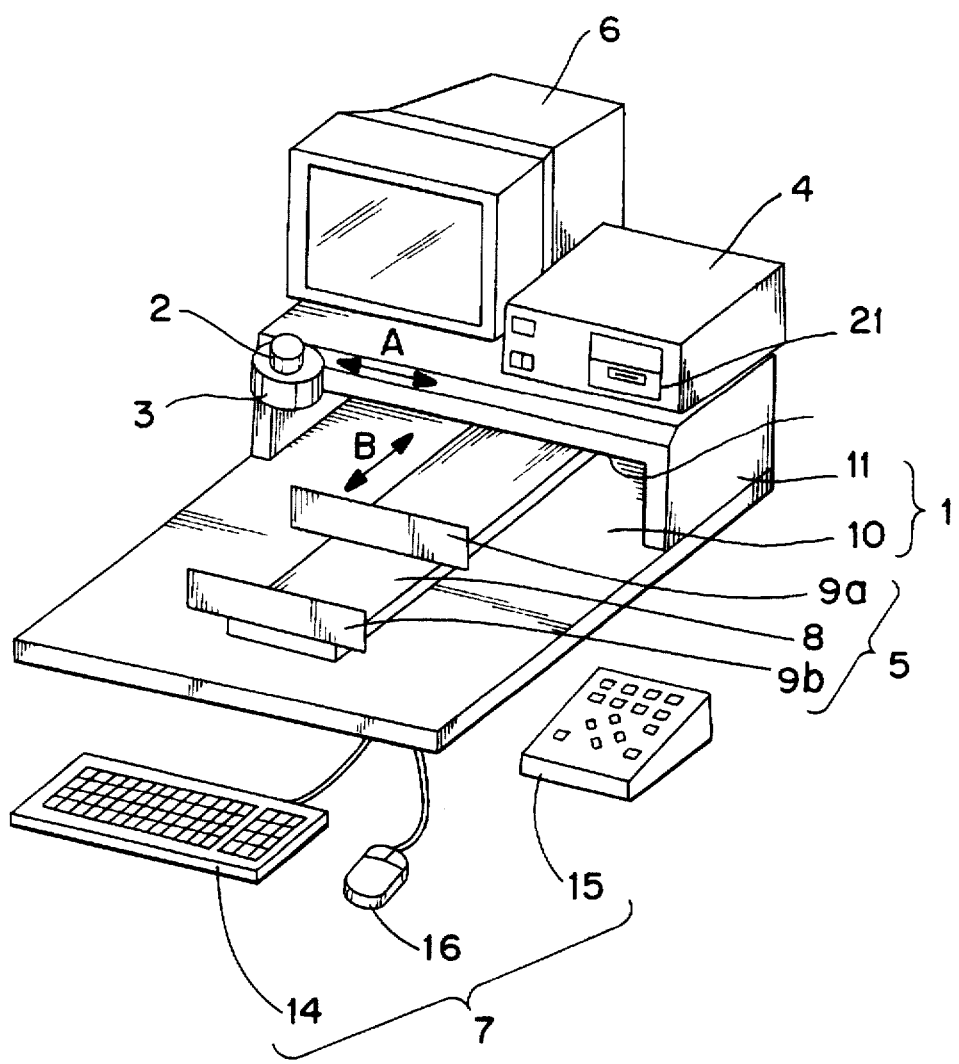
FIG. 1 is a perspective view of an inspection device.

FIG. 1 illustrates an inspection device used by an inspector who visually evaluates the quality of the mounting of each component on a printed substrate. The device includes a stage unit 1, an imaging unit 2, a light unit 3, a controller 4, a substrate stage 5, a monitor 6, and an input unit 7.

The stage unit 1 includes a box-shaped housing 11 with a rectangular opening 12 located on its front surface. Housing 11 sits on baseboard 10. Controller 4 and monitor 6 are positioned on top of housing 11. Imaging unit 2 and light unit 3, which constitute a single entity, are mounted above the opening 12.

A color video camera is located in the imaging unit 2 along with an optical system having a zoom lens with manually adjustable magnification. Light unit 3 includes annular light sources 17, 18 and 19 (FIG. 2) that emit, respectively, red, green and blue light and are shielded by a hood. Imaging unit 2 and light unit 3 are connected to an X-axis table 20 in housing 11 (see FIG. 2) and travel along the X axis, which is indicated in FIG. 1 as direction A.

Substrate stage 5 includes a Y-axis table 8 that is connected to baseboard 10 in such a way that it can travel along the Y axis, which is indicated in FIG. 1 as direction B. Substrate stage 5 also includes substrate supports 9a and 9b, which are fixed to the top of Y-axis table 8.

When an inspection is performed, the substrate to be inspected is held in place by supports 9a and 9b. When the inspector indicates that the inspection should be executed, the imaging unit 2 and light unit 3 move along the X axis, while the substrate stage 5 moves along the Y axis. The viewing zones on the substrate are imaged, and the image data are supplied to controller 4. The inspector judges the quality of every portion to be inspected by referring to images displayed on monitor 6.

The controller 4 includes a floppy disk drive 21, which reads CAD data or data representing the class of each component and stores them in an internal memory. Prior to inspection, controller 4 uses the data to establish viewing zones on the substrate to be inspected.

Input unit 7 includes keyboards 14 and 15 and mouse 16. Prior to the inspection, the inspector enters all necessary data via large keyboard 14 and mouse 16. During an inspection, the operator uses small keyboard 15 to execute the processing, to move to the next viewing zone, to indicate the portion to be inspected, and to enter the result of the quality judgment.

In addition to displaying the image captured by imaging unit 2, monitor 6 displays screens facilitating data input during initialization and showing the result of the inspection.

Figure 2:
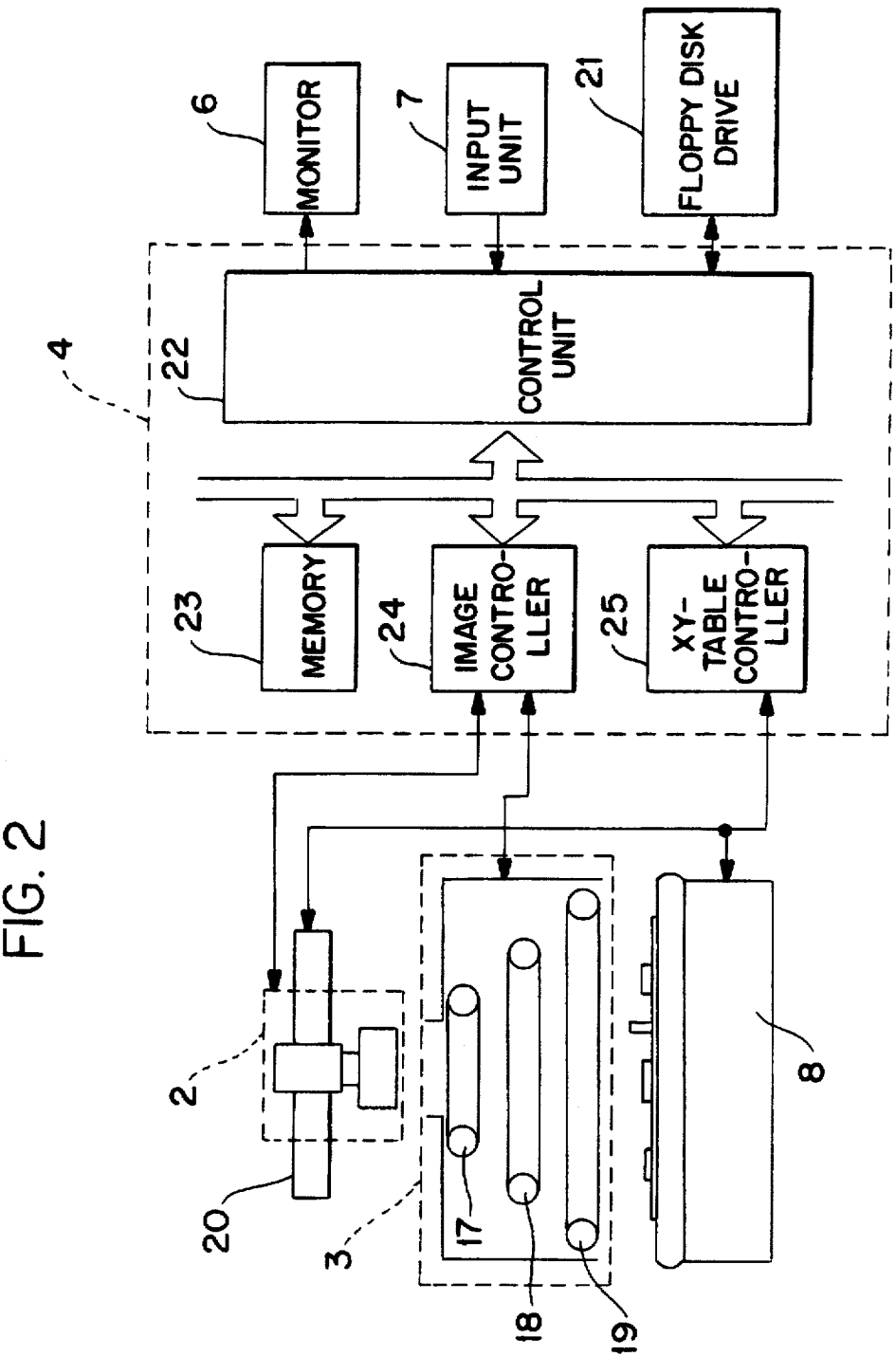
FIG. 2 is a block diagram of the electrical configuration of the inspection device of FIG. 1.

FIG. 2 shows the electrical configuration of the inspection device. The controller 4 includes control unit 22, memory 23, image controller 24 and XY table controller 25.

Image controller 24 has an interface that connects control unit 22 with imaging unit 2 and light unit 3. Through this interface, control unit 22 controls the quantity of light emitted by each of light sources 17, 18 and 19, along with the interactive balance of each color of light received by imaging unit 2.

The X-axis table 20 and Y-axis table 8 each have a drive mechanism (not shown). One drive mechanisms causes X-axis table 20 to move imaging unit 2 and light unit 3 along the X axis, while the other causes Y-axis table 8 to move the substrate stage 5 along the Y axis.

XY table controller 25 has an interface that connects control unit 22 with the drive mechanisms for the X-axis table 20 and Y-axis table 8. The operation of each drive mechanism is based on a command from control unit, 22. By controlling the position of tables 20 and 8, control unit 22 causes the field of view of imaging unit 2 to coincide with a viewing zone.

Control unit 22 has a microprocessor that reads data from and writes data into each of the input and output units. Control unit 22 also controls all operations performed by the inspection device during initialization prior to inspection and during inspection.

Memory 23 stores initialization data generated by control unit 22, image data representing the object to be inspected, and data concerning inspection results that are entered via input unit 7.

Before initialization, library data concerning the field of view and magnification needed to inspect each class of component are compiled and stored, and the CAD data which specify the class and location of each component on the substrate are placed in memory 23. During initialization, the CAD data are linked with the library data to verify the data associated with the location of the field of view and the magnification used to inspect each component on the substrate. Once verified, these data are used to generate data used in establishing viewing zones on the substrate.

Figure 3A:
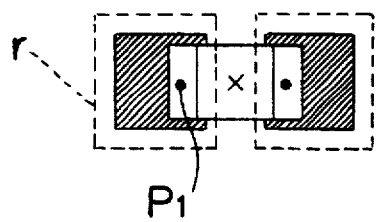
FIGS. 3A–3C provide examples of how the data defining a field of view might be selected.
Figure 3B:
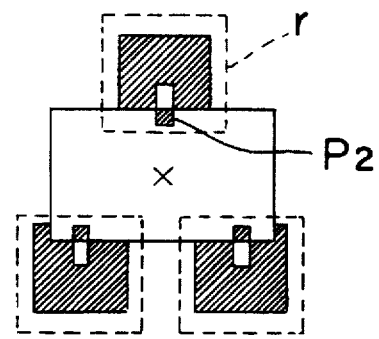
Figure 3C:
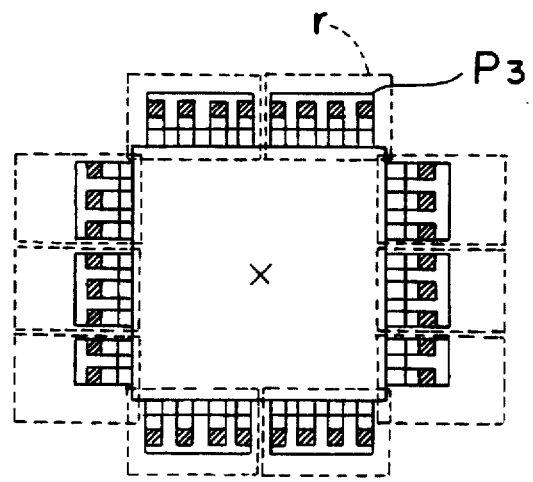

FIGS. 3A-3C show examples of how data concerning fields of view might be established in the library data. In particular, FIGS. 3A-3C show specified small regions r containing portions of a component that are to be inspected. The small regions r are designated as component viewing zones. A rectangular region that circumscribes all of the component viewing zones r for a single component is the field of view for that component. To define this field of view, data are stored which represent the size of each component viewing zone r and its location.

The library data displayed on the screen during inspection also include marks to identify the location of each portion of a component to be inspected. These marks, or pointers, are labeled $p_1$, $p_2$ and $p_3$ in the examples shown. The pointers can be placed in any location in a viewing zone. The shape and size of the pointers can be selected from an extensive menu. Data associated with a chosen pointer are stored so as to correspond to the data which establish the viewing zone.

Figure 4:
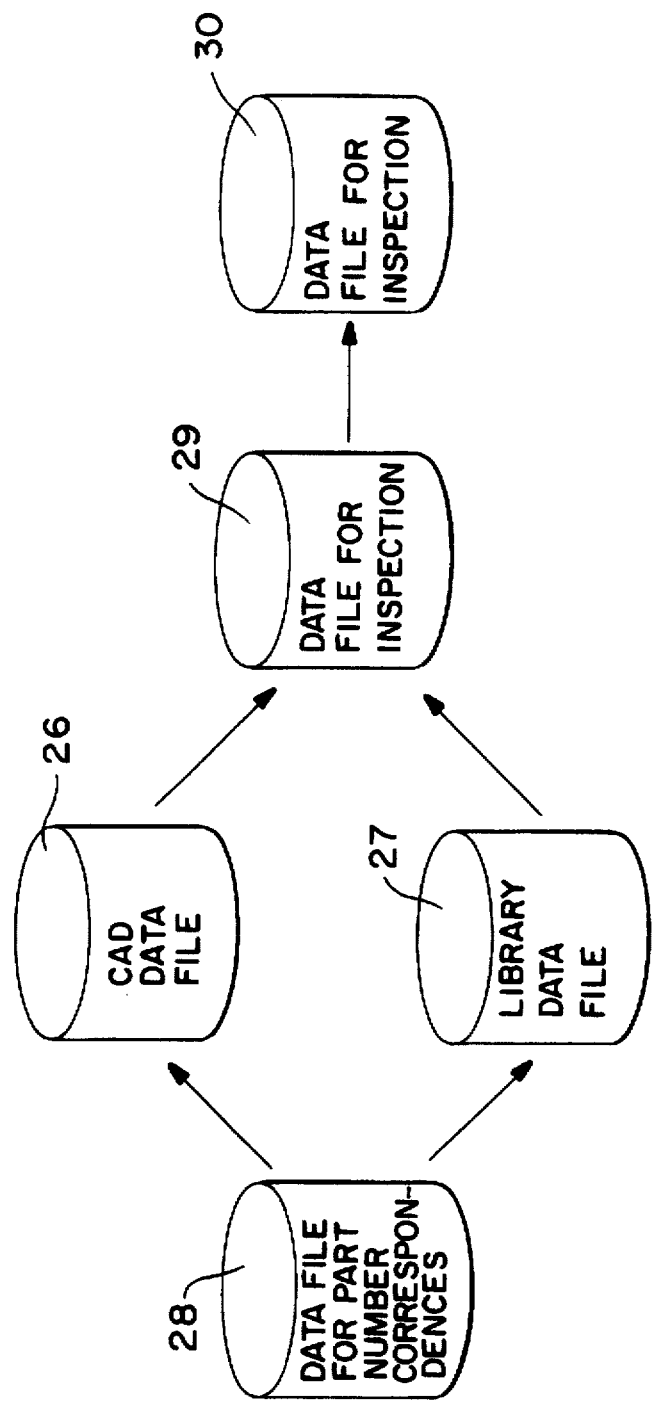
FIG. 4 illustrates how data are configured in the memory.

FIG. 4 shows the configuration of the data associated with establishing viewing zones in the memory 23. This configuration includes CAD data file 26, which stores the CAD data; library file 27, which stores the library data; data file 28, which stores data corresponding to the part numbers; and data files 29 and 30, which are used in the inspection. FIG. 5 shows that the CAD data file 26 stores, for every component on the substrate, the name of the component, its part number, the location where it is mounted, and the orientation at which it is mounted. The name given to a component permits different examples of a single type of component to be distinguished. For example, if there are three components of a type identified as "C" on the substrate, the identifier "C" is used together with a serial number, so that the components are designated "C01", "C02" and "C03". The part number indicates the type of component as designated by the manufacturer. Every component on the substrate has such a number. In the example shown, two of the three components of the type "C" (C01 and C02) have the same part number (CH001) while the third component (C03) has a different part number (CH002). The data which represent the location where the component is mounted are the X and Y coordinates of the center point of the component on the substrate. Data representing the orientation in which the component is mounted, a condition that is stipulated for each component, are given in units of 90°.

Data file 28 serves as a reference file that provides library data appropriate for a given part number from the CAD data file 26. As is shown in FIG. 6, data file 28 stores the class of component which corresponds to each part number as well as data concerning the variants. The class to which the component belongs refers to data that distinguish components with an identical shape. The variant data are codes that are used to distinguish a number of components belonging to the same class. In the example shown, the components with part numbers CH001 and CH002 both belong to class $C_1$, while the components numbered TR001 and TR002 belong to two different classes ($TR_1$ and $TR_2$).

As is shown in FIG. 7, library data file 27 stores data that establish a field of view and a pointer for each class and variant of component. Library data file 27 also identifies the optimal magnification at which to view the portion of the component to be inspected. The data which establish a field of view for each class of component consist of data $r_1$, $r_2$ etc. Each data set establishing a field of view consists, for example, of the coordinates defining the location of the upper left and lower right-hand corners of the field of view relative to the center point of the component. These data would represent the location and size of the field of view. Pointer data $p_1$, $p_2$, etc. indicate the location, type and size of the pointer created in each viewing zone. If all components on the substrate are inspected using a single magnification regardless of their class, only data to define the field of view and the pointer need to be stored in library data file 27.

The control unit 22 consults data file 28 for the part numbers and reads out of file 27 the library data for every component found in CAD data file 26. Control unit 22 then executes processing to link the CAD and library data together. In this way, data are assembled to define the field of view, the pointer and the magnification for each component on the substrate. These data are stored in inspection data file 29.

Control unit 22 uses the data stored for each component in file 29 to create data establishing a number of viewing zones on the substrate. Control unit 22 then associates the data for each viewing zone with data defining the field of view and pointer for each component contained in that zone and stores the combined data in file 30, a second file for inspection data.

The viewing zones, which encompass every component on the substrate, are drawn so that each contains components to be inspected at the same magnification. The location of each zone is adjusted so that the entire field of view for each component is contained in a viewing zone.

Figure 8:
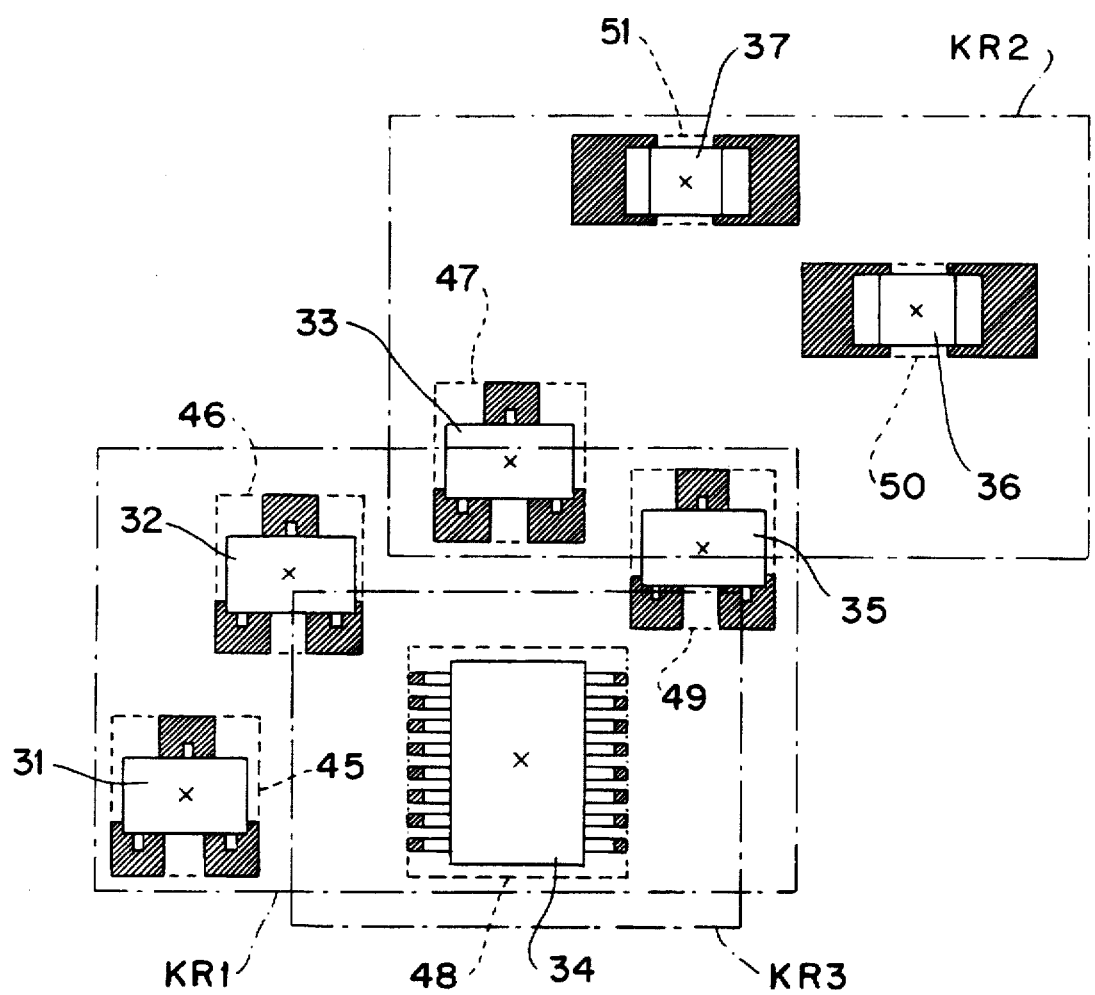
FIG. 8 shows an example of viewing zone selection.

FIG. 8 shows an example of how viewing zones might be drawn. Using data in the first inspection data file 29, fields of view 45 through 51 are drawn for components 31 through 37 on the substrate. Thereafter, control unit 22 uses a region to be imaged at a given magnification and scans in the structural data representing the substrate (which are generated from the CAD data). An imaging region is an area where all components can be viewed at the magnification value stipulated for that region. The imaging region is then specified as a viewing zone. Its location, the magnification it requires, and the various data characterizing the components contained in it are linked together and stored in inspection data file 30.

In the example shown in FIG. 8, the same magnification (e.g., 1×) is stipulated for components 31, 32, 33, 35, 36 and 37, while a different magnification (e.g., 2×) is stipulated for component 34. Three viewing zones are created. Zone KR1 is drawn so as to include the fields of view 45, 46 and 49 of components 31, 32 and 35. Zone KR2 includes the fields of view 47, 50 and 51 of components 33, 36 and 37. Zone KR3 is drawn around the field of view 48 for component 34.

Figure 9:
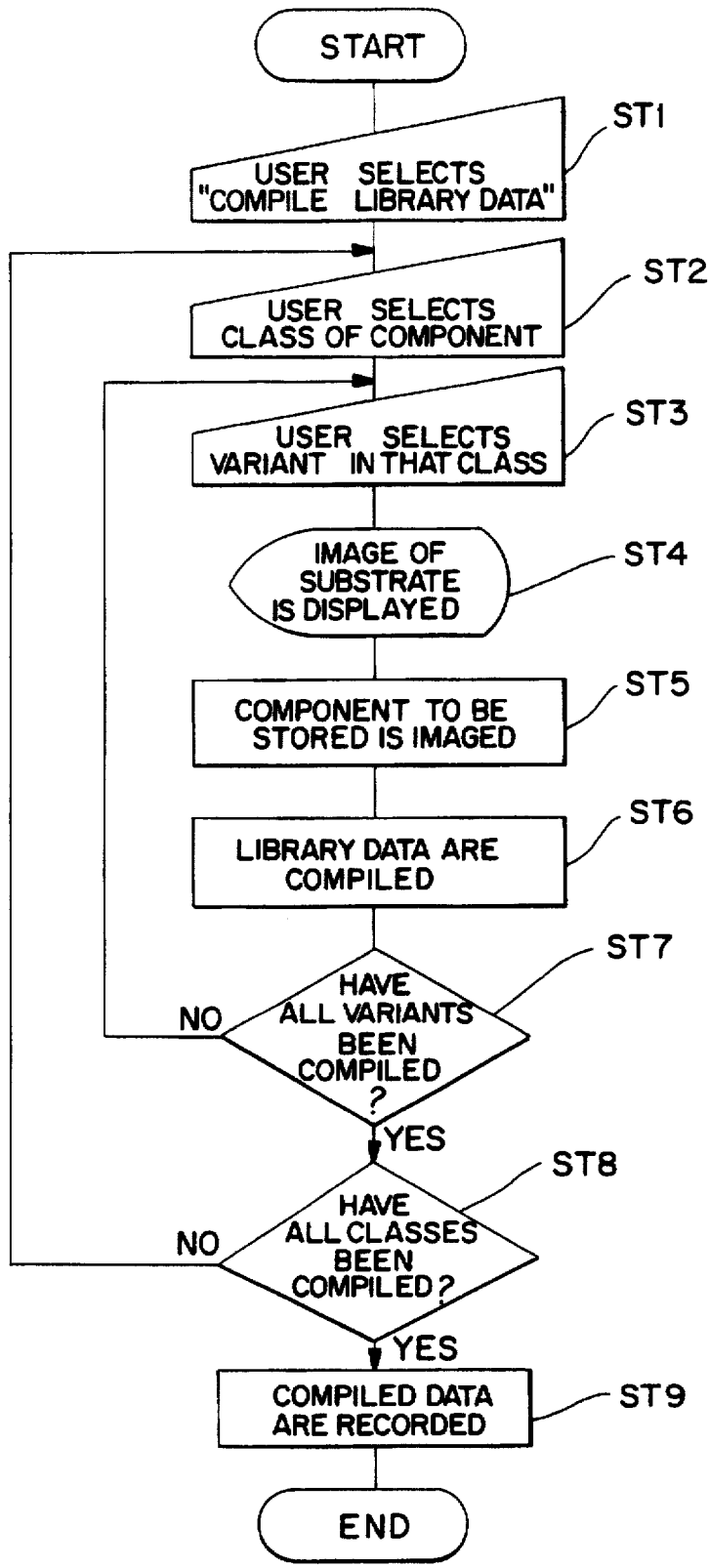
FIG. 9 is a flowchart of a procedure by which library data are compiled.
Figure 10A:
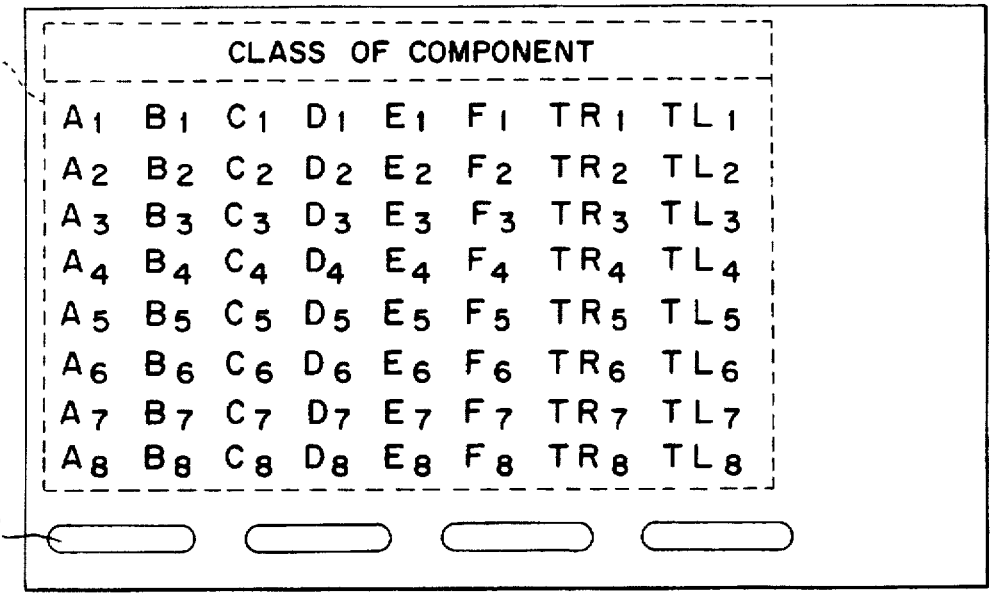
FIGS. 10A–10B show monitor displays when library data are being compiled.

FIG. 9 illustrates a procedure by which control unit 22 compiles the library data. Generally, the library data are compiled by creating initialization data for a general set of components that are currently available. At the start of the compiling procedure, control unit 22 controls every part of the device, operates imaging unit 2 and light unit 3 and adjusts the conditions for imaging and for data processing. An initial menu screen then appears on monitor 6. In step 1 of the procedure, the operator uses keyboard 14 to select the operation of compiling library data from the initial menu. This causes the contents of file 28, which stores product numbers in memory 23, to be displayed on monitor 6. FIG. 10A shows an example of a screen that might be displayed on monitor 6 at this time. Table 36, which gives the class of each component, is displayed, as are keys 37, which may be accessed using mouse 16 to verify selections.

Figure 10B:
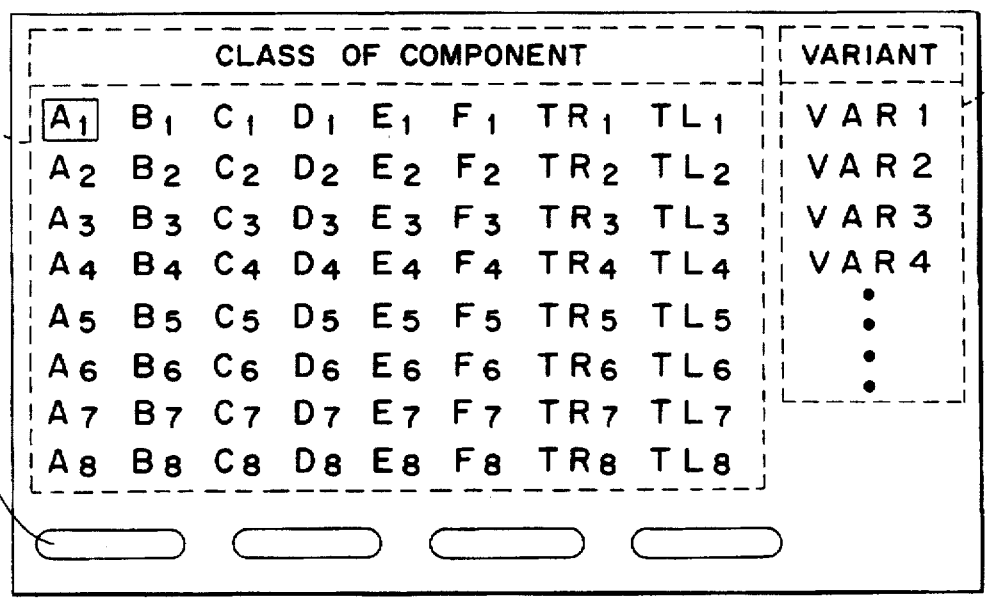

In step 2, the operator selects from the table 36 a given class of components (for example, $A_1$), and table 38 (see FIG. 10B), which shows all the variants in that class, is displayed. In step 3, the operator selects a given variant from the table, and the image of a reference substrate that was previously placed on stage 5 is displayed on monitor 6 (step 4).

The reference substrate is one on which the given component has been correctly soldered to achieve a mounting of acceptable quality. The operator determines a location to be imaged which corresponds to a component that is the selected variant of the selected class. Using the image of this component, the operator defines an inspection region and a pointer, and uses keyboard 14 to enter a desired magnification (step 5). Based on this information, control unit 22 compiles library data (step 6).

When the processing has been executed for every variant (step 7) of every class (step 8) of component in the table 36, the control unit 22 combines the data stored for each component and stores them in the library data file 27 (step 9). To compile the library data, control unit 22 places in memory 23 data representing the shape of each component, and reference data created by another terminal device and obtained via floppy disk drive 21. These data may be amended as needed, and appropriate data may be added or corrected during use.

Figure 11:
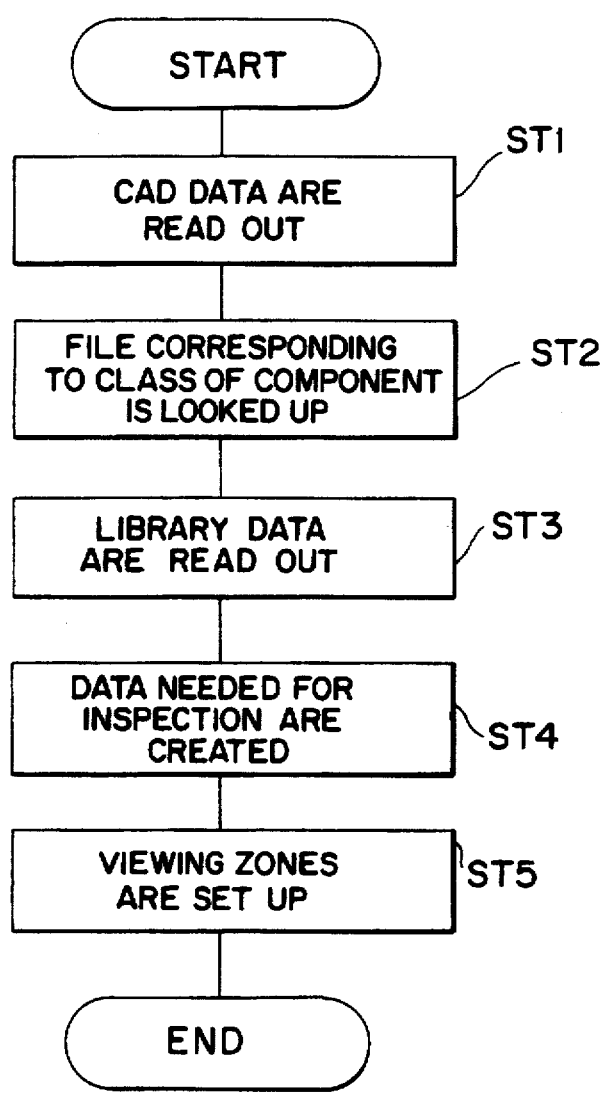
FIG. 11 is a flowchart of a procedure by which data are loaded and viewing zones are selected.

FIG. 11 shows the procedure used in the initialization process mentioned above. First, the inspector selects initialization mode from the initial menu screen. The file names of the various CAD data files stored in the memory 23 are displayed on monitor 6. The inspector selects from this menu the data file for the substrate to be initialized. Control unit 22 reads out the appropriate CAD data file 26 and sets up a work area in memory 23 (step 1).

In step 2, control unit 22 uses the part number in the CAD data to look up the data file 28 that corresponds to that number. Control unit 22 then specifies the class and variant identity of each component on the substrate that is being initialized.

In step 3, control unit 22 reads out of the file 27 the library data for every component on the substrate. Control unit 22 then links the library data for a given component with the CAD data for that component to create a data set defining a field of view, a pointer and a magnification for every component on the substrate. Control unit 22 stores these data sets in the inspection data file 29 (step 4).

In step 5, control unit 22 defines and scans an imaging region in the structural data for the substrate obtained from the CAD data. This imaging region, which conforms to the field of view and a specified magnification of imaging unit 2, is based on data specifying the field of view in the file 29. Control unit 22 checks the fields of view contained in the imaging region at every scanning position and identifies the location of the imaging region.

The data associated with defining the imaging region at every positioning point (the location of the region, its size, the magnification to be used, and so on) are stored as data defining a viewing zone in inspection data file 30. The data defining a field of view and a pointer for each component, which are stored in inspection data file 29, are grouped for all components found in a single viewing zone. The data are associated with the data defining the inspection region and stored in data file 30.

Figure 12:
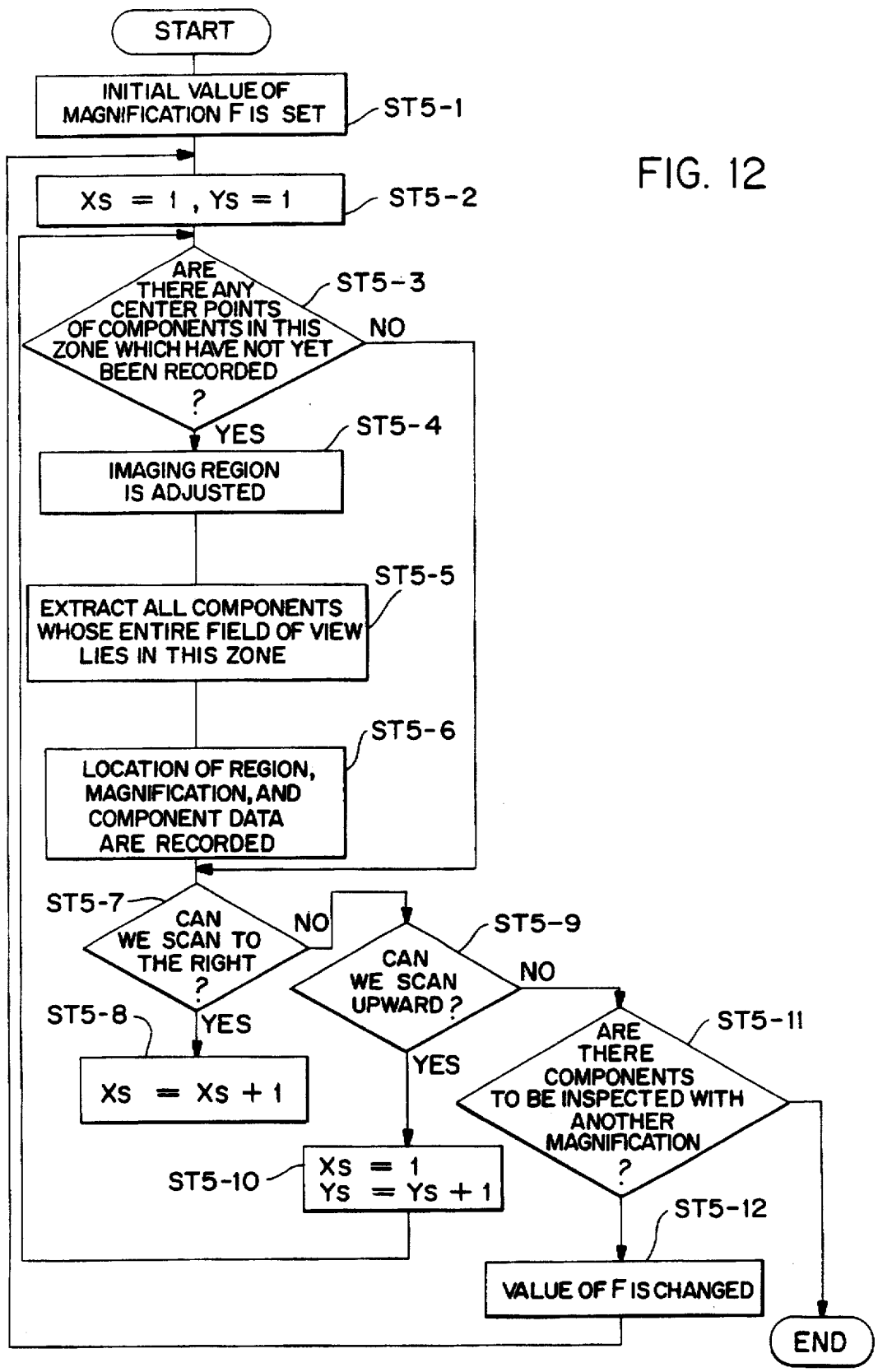
FIG. 12 is a flowchart showing details of how viewing zones are selected in the procedure of FIG. 11.

FIG. 12 shows details of the procedure that is executed in step 5 of the procedure illustrated in FIG. 11. In step 5-1, the initial magnification is set. Control unit 22 sets the magnification F at an initial value (e.g., 1×). In step 5-2, an imaging region corresponding to the magnification is created and a starting point for scanning is selected. Control unit 22 uses the lower left-hand corner of the region as a reference point. For this reference point ($X_5$, $Y_5$), control unit 22 writes the coordinates (1, 1) of the lower left-hand corner of the substrate. Control unit 22 checks this region for the center point of a component for which the magnification has been specified as 1× (step 5-3).

If a center point of a component having the appropriate desired magnification is not present in the region, control unit 22 determines in step 5-7 whether the right border of the imaging region coincides with the right edge of the substrate and in step 5-9 whether the upper border of the imaging region coincides with the upper edge of the substrate. If either of those conditions is true, the control unit 22 changes in step 5-8 or 5-10 the coordinates of the reference point to those of the next position, and repeats execution of the determination processing in the step 5-3.

When the scan reaches a location where the center point of a component to be viewed at a magnification of 1× is contained in the region, control unit 22 uses this component as a reference and adjusts the imaging region so that it includes a number of fields of view for components with the same magnification value (step 5-4).

FIGS. 13A–13D illustrate an example of how the imaging region is adjusted. Three imaging regions ($sr_1$, $sr_2$ and $sr_3$) for components to be viewed at magnification F (e.g., 1×) are found in the same region. In the drawing, $p_1$, $p_2$ and $p_3$ are the center points of those components and R is the imaging region.

Figures 13A, 13B:
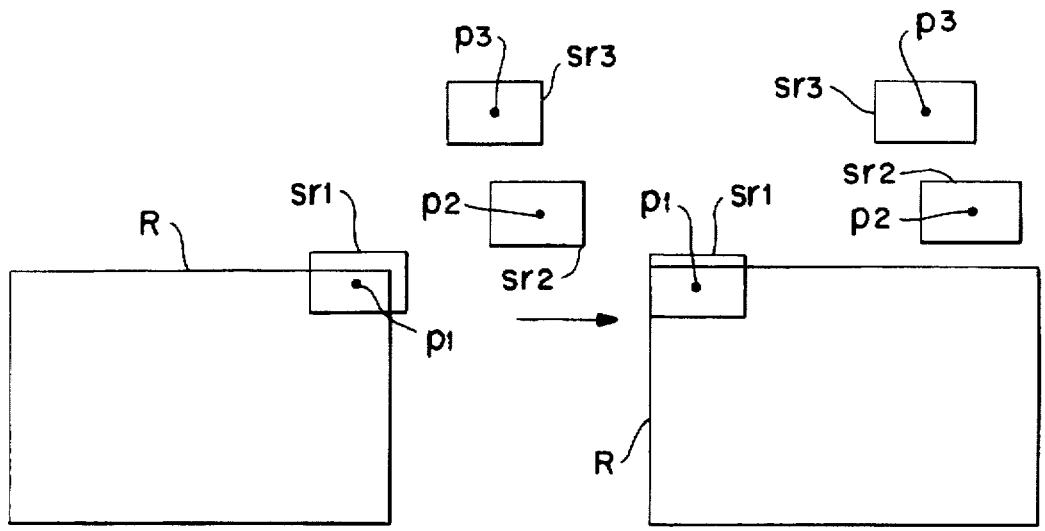
FIGS. 13A–13D illustrate an example of how the location of a viewing zone is adjusted.

In FIG. 13A, the center point $p_1$ of the first component has been found in imaging region R. Control unit 22 adjusts the location of imaging region R so that the left boundary of field $sr_1$ is superimposed on the left boundary of imaging region R (FIG. 13B). Control unit 22 then moves imaging region R until the lower boundary of field $sr_1$ is superimposed on the lower boundary of imaging region R (FIG. 13C).

At this point, the fields of view for the two other components ($sr_2$ and $sr_3$) are both within imaging region R. Control unit 22 then adjusts the location of imaging region R slightly and executes the final processing to define its location (FIG. 13D).

Figures 13C, 13D:
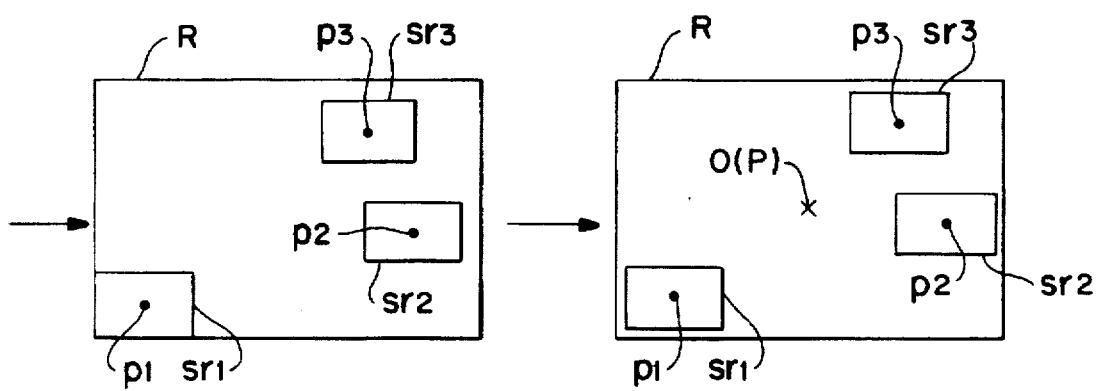
Figure 14:
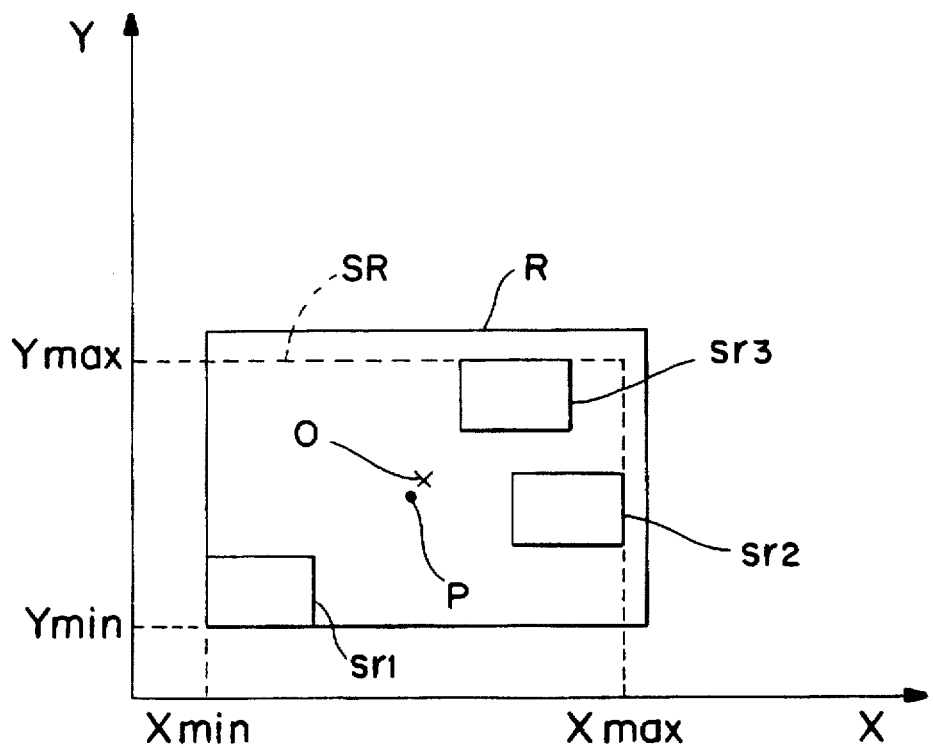
FIG. 14 shows a final position adjustment performed on an imaging zone.

FIG. 14 illustrates the process by which the final location of the imaging region R shown in FIG. 13D is defined. Control unit 22 first checks the X and Y coordinates of the highest point in each of $sr_1$, $sr_2$ and $sr_3$. Control unit 22 then extracts from these data the minimum values $x_{min}$, $y_{min}$ and the maximum values $x_{max}$, $y_{max}$.

Next, control unit 22 calculates the coordinates (X, Y) of the center point P of the rectangular area SR determined by the coordinates $x_{min}$, $y_{min}$ and $x_{max}$, $y_{max}$ as:

$$(X,Y) = \left( \frac{X_{max} + X_{min}}{2}, \frac{Y_{max} + Y_{min}}{2} \right) \ldots (1)$$

Control unit 22 then moves imaging region R so that its center point 0 is superimposed on center point P. The location of the final imaging region R is then determined as shown in FIG. 13D.

Referring again to FIG. 12, when the location of imaging region R is determined as discussed above, control unit 22 extracts, in step 5-5, each component having an entire field of view that lies within the imaging region (and for which the magnification value F has been stipulated). Control unit 22 verifies the location of the imaging region at this time and its magnification F, links these data with the data representing the field of view and the pointer for each component which was extracted in step 5-5 above, and stores the combined data in inspection data file 30 (step 5-6).

If regions on the substrate which have not been processed remain when the processing in step 5-6 has been completed, the location of the reference point is changed in step 5-8 or 5-10, and the imaging region is moved to the next scanning position. The processing is repeated to produce multiple viewing zones. When the entire imaging region has been scanned at the magnification F (i.e., the result of steps 5-7 and 5-9 are both "no"), control unit 22 proceeds to step 5-11 and checks whether there are any components on the substrate for which another magnification has been stipulated. If so, control unit 22 changes the magnification F in step 5-12, returns to step 5-2, and repeats the processing described above. Control unit 22 repeats this process for each specified magnification level until the data defining the field of view at every magnification and the data for every component found in every viewing zone has been stored in inspection data file 30.

Figure 15:
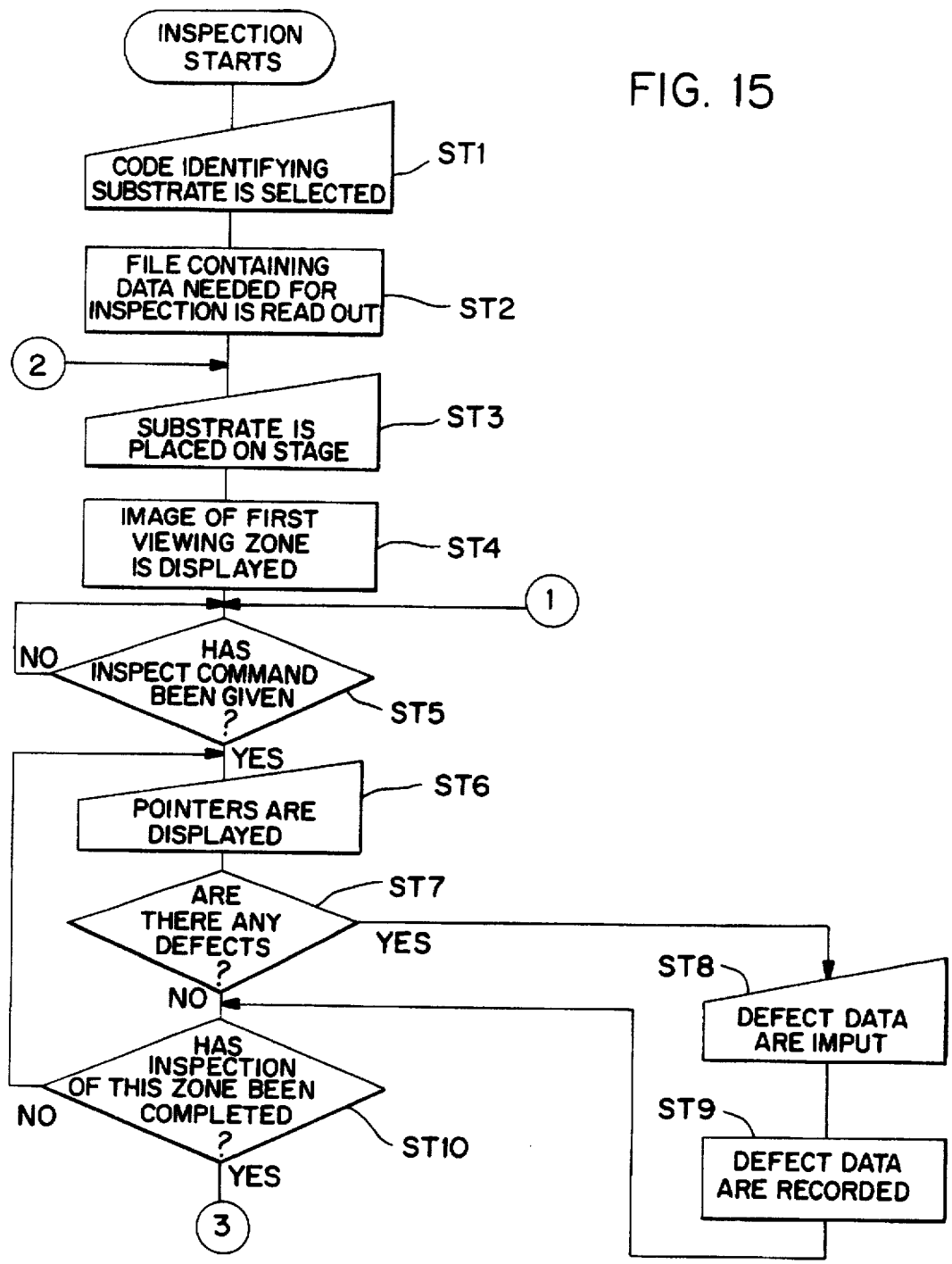
FIGS. 15 and 16 are flowcharts of an inspection procedure.
Figure 16:
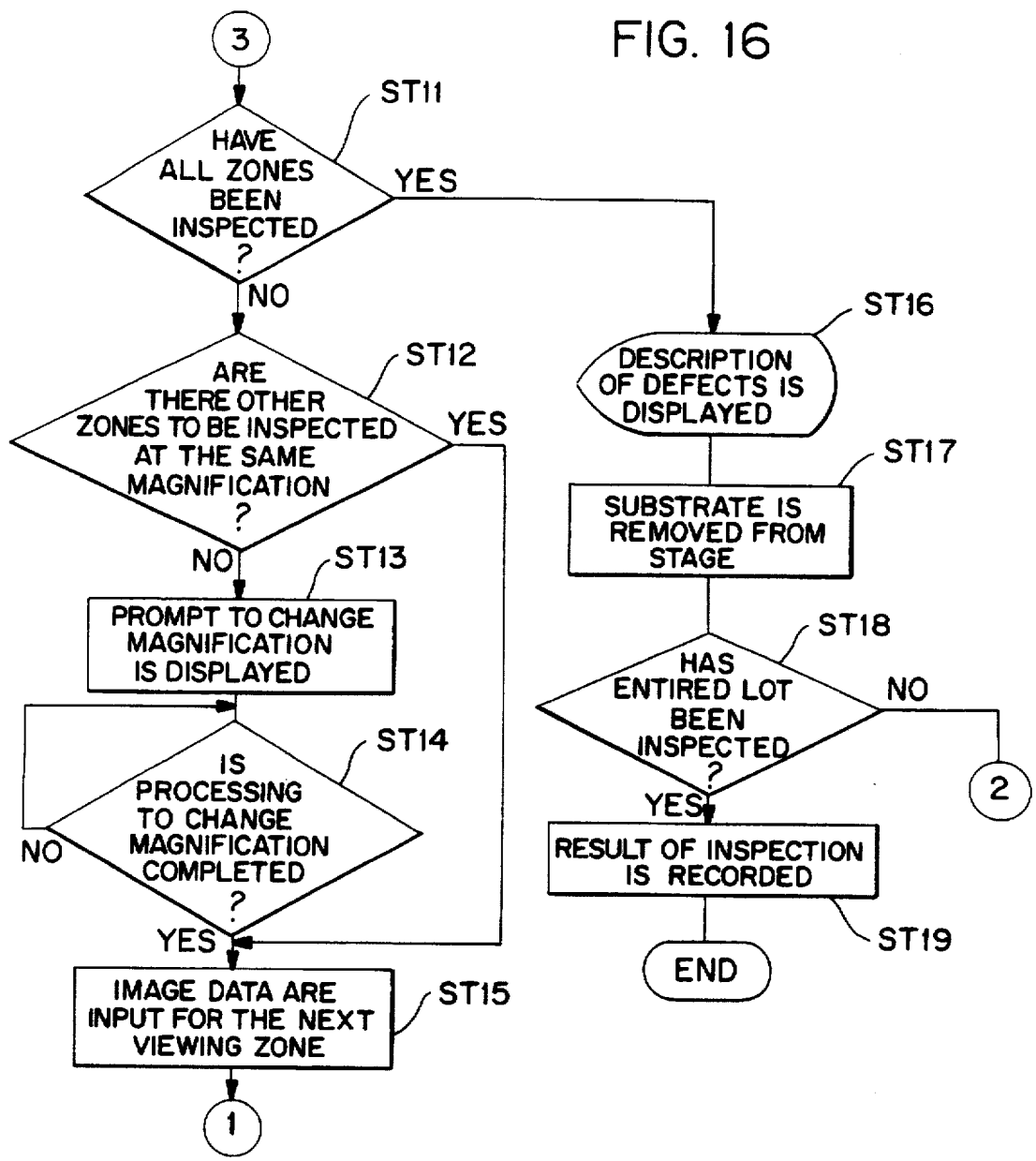

FIGS. 15 and 16 show the inspection procedure executed after the checking procedure has been completed. In step 1, the inspector selects the name of the substrate that is to be inspected. Thereafter, the data defining the viewing zones are read out of the inspection data file 30 and sent to control unit 22 (step 2).

In step 3, the inspector places the substrate to be inspected on stage 5 and gives a start command. Control unit 22 controls X-axis table 20 and Y-axis table 8 to find the first viewing zone on the substrate. Using this viewing zone, control unit 22 determines the field of view for imaging unit 2 and causes imaging to commence. This results in display of the image data for the first viewing zone on monitor 6 (step 4).

Figure 17:
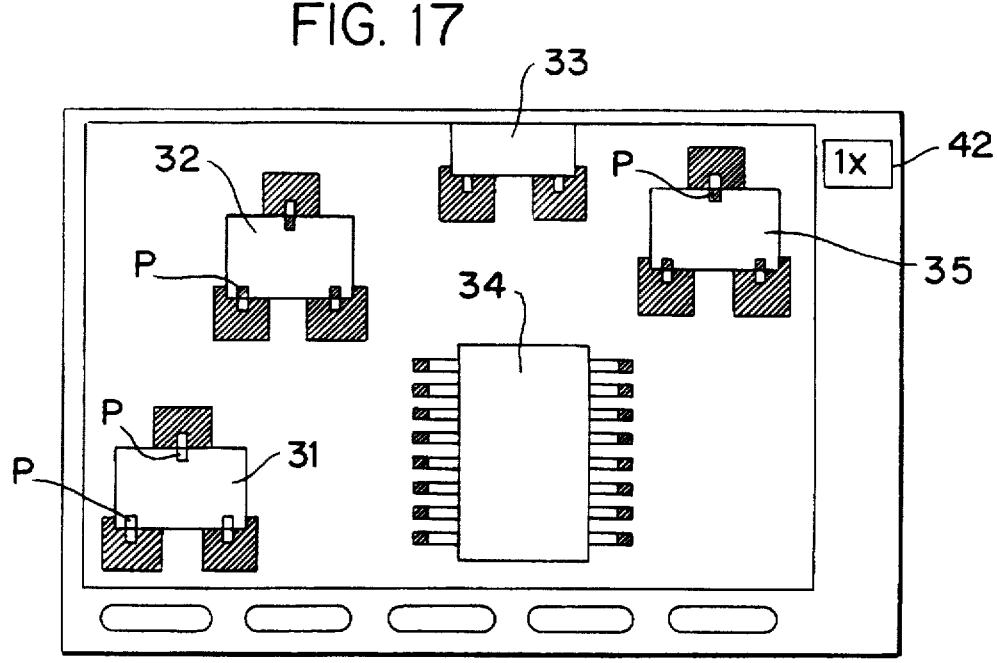
FIGS. 17–19 show examples of monitor displays during an inspection.

FIG. 17 shows an example of an image displayed on monitor 6 when the location of viewing zone KR1 shown in FIG. 8 has been found by imaging unit 2. Based on the pointer data, a pointer P is displayed in every inspection region of components 31, 32 and 35, the components whose entire fields of view lie within zone KR1. Pointers are not displayed for component 33, whose field of view lies only partially in this viewing zone, and component 34, for which a different magnification has been stipulated. At this time, the magnification to which imaging unit 2 is adjusted is displayed in a display unit 42 positioned in the upper right-hand corner of the screen.

Figure 18:
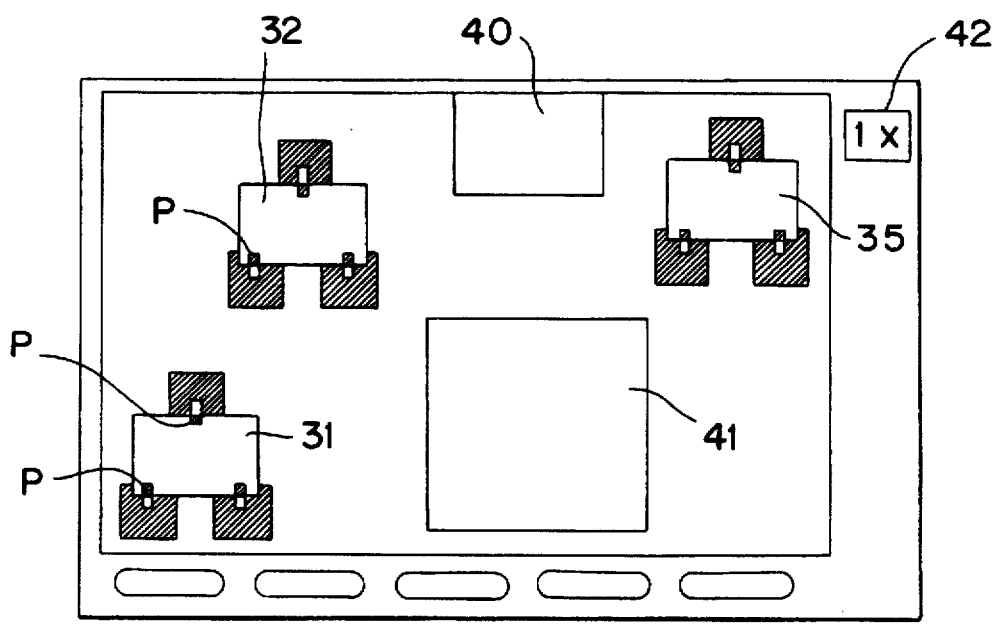

FIG. 18 shows an alternative example of an image displayed on monitor 6. In this example, components 31, 32 and 35 are displayed just as they were in FIG. 17, but components 33 and 34 are not. Components which do not lie entirely in the viewing zone (i.e., component 33), and components for which a different magnification has been specified (i.e., component 34), are omitted from the display. Instead, the portions of the screen which correspond to the fields of view of those components, areas 40 and 41, are displayed at a uniform density (e.g., as black regions).

Referring again to FIG. 15, in step 5, the inspector enters a command to start inspecting the displayed viewing zone. Control unit 22 displays only the pointers for the portions to be inspected in the first inspection region in this zone (step 6). Using these pointers, the inspector verifies the identity of the first portion to be inspected, performs a visual inspection of it, and, if its quality is acceptable, enters via keyboard 15 a command to transmit the result. If there are other inspection regions in this viewing zone (so that steps 7 and 10 result in "no"), the procedure returns to step 6 and control unit 22 displays the pointers for the next inspection region.

If the soldering of the portion being inspected is defective (so that the answer in step 7 is "yes"), the inspector enters data to indicate a defect via keyboard 14 or 15 (step 8). These data are stored in memory 23 along with the data representing the inspection region and the pointer (step 9).

The same procedure is executed successively on every inspection region in the first viewing zone. When a quality judgment is rendered for the last place to be inspected in this zone, the answer in step 10 is "yes". If the same magnification has been stipulated for the next viewing zone, the answer in step 11 is "no" and that in step 12 is "yes". Proceeding to step 15, control unit 22 transmits a command to XY table controller 25 to position the field of view of imaging unit 2 on the second viewing zone.

In this way, image data are collected for every component in this zone for which this magnification has been stipulated. When every region has been inspected, control unit 22 causes monitor 6 to display a message indicating that the magnification should be changed (step 13).

Figure 19:
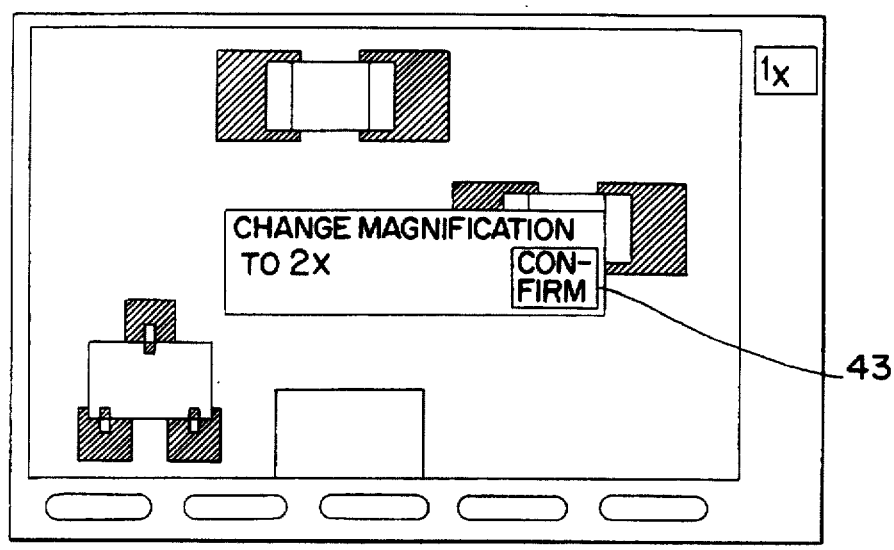

FIG. 19 shows an example of the message which might be displayed when viewing zone KR2 in FIG. 8 above has been inspected. Message box 43 is displayed over the image data in zone KR2. The inspector changes the magnification of imaging unit 2 in response to the message and executes verification processing using keyboard 14 or 15 or mouse 16. Now the answer in step 14 is "yes", and control unit 22 proceeds to step 15, where image data for the first viewing zone is captured at the new magnification. In this example, the magnification is changed manually. It could also be changed automatically if the imaging system in imaging unit 2 had an electrically operated zoom lens and control unit 22 were configured so as to be able to read the current magnification.

When all viewing zones created on the substrate have been inspected, the answer in step 11 is "yes". At this point, control unit 22 reads from memory 23 all defect data for the substrate and displays them on monitor 6 (step 17). In response, the inspector removes from stage 5 the substrate that has just been inspected, places a new substrate on the stage (step 3), and proceeds to inspect it.

When defect data for an entire set of substrates have been stored in memory 23, the inspector can enter a data store command via input unit 7. This causes the defect data for every substrate in that lot to be stored on a floppy disk (steps 18 and 19). This floppy disk can be read by a device to correct the soldering, and the data can be used to repair all of the defective spots on the substrate. When the inspector enters a calculate command via input unit 7, the defect data for every substrate in the lot will be used to execute various calculations useful for analyzing quality, including summing and statistical operations.

The field of view has been described as a rectangular area encompassing all of the inspection regions, each of which contains a single component. However, it would be equally acceptable to define a field of view containing only some of the inspection regions. Likewise, instead of procuring the data identifying the class and location of every component from the CAD data, these data could be entered manually through input unit 7.

The method for establishing viewing zones described above can also be used in automatic inspection devices. In this case, data associated with feature analysis of image data in each inspection region is stored as library data along with the sorts of data discussed above. This would substantially reduce the initialization time. In addition, a viewing zone is defined during initialization by using an imaging region based on a standard magnification (e.g., 1×). For each location where there is a viewing zone, the data defining the field of view and magnification for each component in the zone are linked to data identifying the zone and stored in inspection data file 30. To inspect a substrate, the image data for each viewing zone is read out successively, and the magnification for imaging each spot to be inspected is changed automatically.

The example provided in the above explanation is a device to inspect the mounting of components on a substrate such a printed circuit board, by generating data to establish viewing zones. However, the invention is not limited to such cases, and is applicable to any device which generates data needed for inspection to be supplied to an inspection device configured as described herein.

Figure 20:
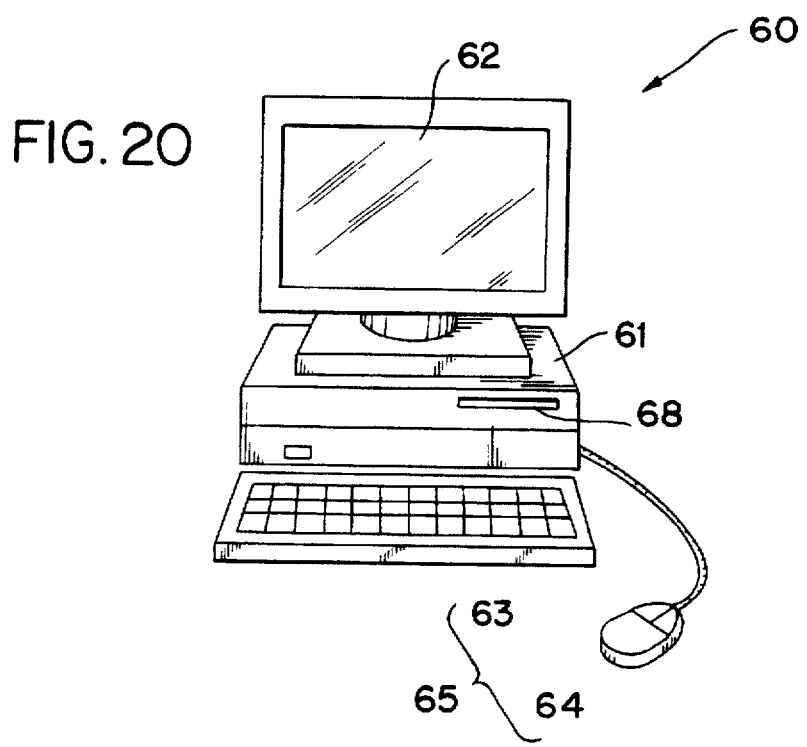
FIG. 20 is a perspective view of a machine for storing data.
Figure 21:
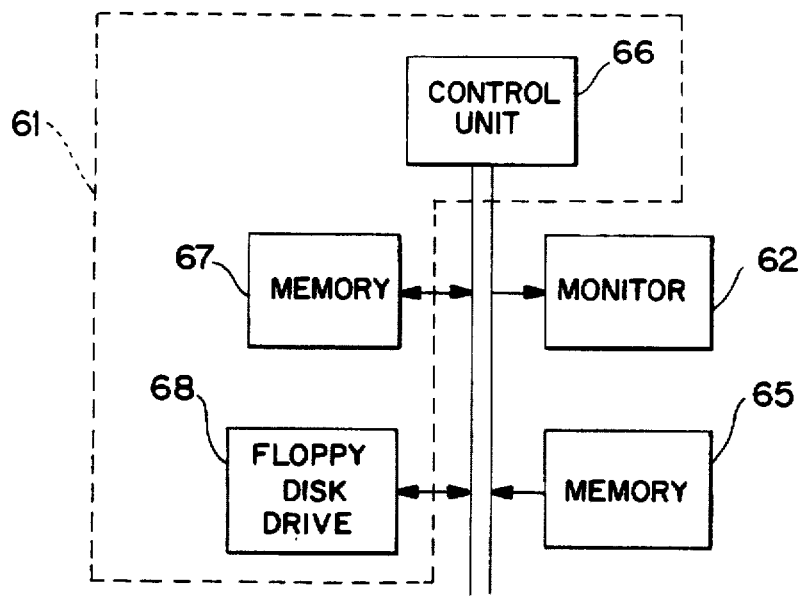
FIG. 21 is a block diagram of the electrical configuration of the machine of FIG. 20.
Figure 22A:
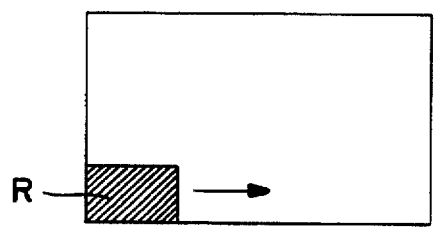
FIGS. 22A and 22B illustrate a method for setting up viewing zones.
Figure 22B:
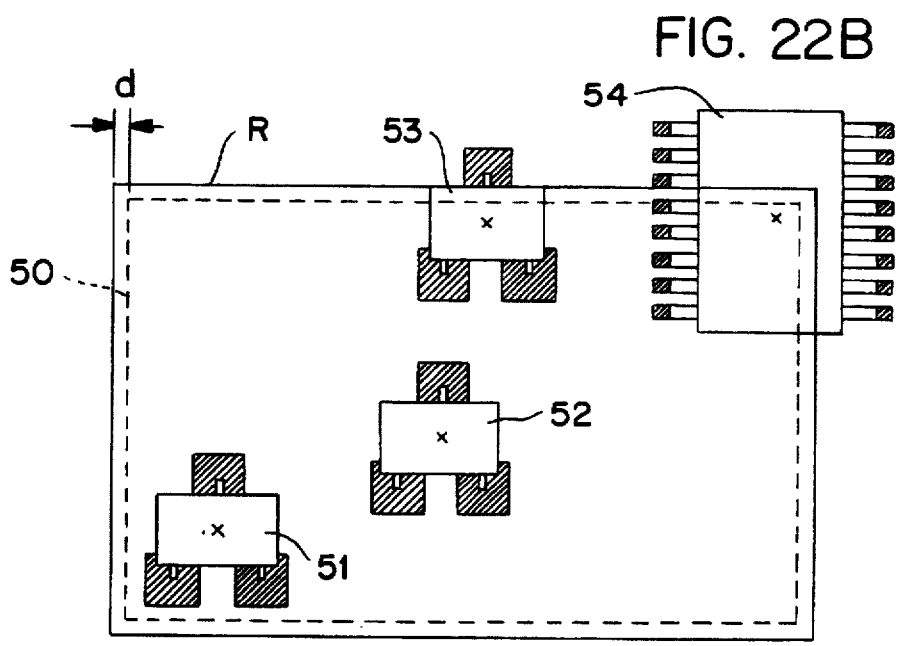

FIG. 20 is a perspective drawing of a machine for generating inspection data, and FIG. 21 shows the electrical configuration of the machine. Machine 60 includes control device 61, monitor 62 and input unit 65, which comprises keyboard 63 and mouse 64. Control device 61 includes control unit 66 (a microcomputer), memory 67 and floppy disk drive 68.

Memory 67 stores the CAD data file 26, library data file 27, data file 28 for part number data and inspection data files 29 and 30. Control unit 66 executes the procedure shown in steps 1 through 4 of FIG. 11 above, links the CAD data in CAD data file 26 for the substrate being initialized with library data for the part number and class of the component which are based on these CAD data, and creates data to represent the field of view, pointers and a magnification for every component on the substrate. Control unit 66 stores these data in inspection data file 29.

Control unit 66 uses the stored data to execute step 5 in FIG. 11 above (i.e., the procedure given in FIG. 12). Control unit 66 creates inspection data for which a correspondence is drawn between data setting up a number of viewing zones on the substrate and data defining a field of view and pointers for the components which lie in each zone. Control unit 66 stores this data in data file 30.

Once the creation of inspection data is completed, control unit 66 transmits the inspection data (stored in data file 30) to a floppy disk that has been loaded in disk drive 58. When this floppy disk is loaded in floppy disk drive 21 in the inspection device pictured in FIG. 1 and read, the inspection data can be transmitted to memory 23 in the control device 4 and the substrate can be inspected at once. The machine 60 can be connected to an inspection device, and it can be configured so as to be able to transmit inspection data.

Other embodiments are within the following claims.

What is claimed is:

1. A method of establishing viewing zones to be used to inspect the attachment of components arranged on the surface of an object, comprising:

establishing data concerning a field of view for at least one class of components;

linking, for a component on the object, data representing the location of the component on the object with the data concerning the field of view previously established for the at least one class of components to which the component belongs; and creating at least one viewing zone on the surface of the object using the linked data for the component on the object, wherein the data concerning the field of view, the data representing the location of the component on the object and the linked data are stored in data files.

2. The method of claim 1, further comprising establishing data concerning a magnification level for the at least one class of components, and wherein the step of linking comprises linking, for the component on the object, the data representing the location of the component on the object with the data concerning the field of view and the data concerning the the magnification level previously established for the at least one class of components to which the component belongs.

3. A device for establishing viewing zones to be used to inspect the attachment of components arranged on the surface of an object, comprising:

a memory storing data concerning a field of view for at least one class of components;

an input device operable to supply, for a component on the objects, data representing a location of the component on the object and a class of components to which the component belongs; and a controller operable to link, for the component on the object, the data from the input device representing the location of the component on the object with the data from the memory concerning the field of view for the at least one class of components to which the component belongs, and to create at least one viewing zone on the surface of the object using the linked data for the component on the object.

4. The device of claim 3, wherein the input device uses design data created to arrange the component on the object to supply the data representing the location of the component on the object and the class of components to which the component belongs.

5. The device of claim 3, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

6. The device of claim 3, wherein the memory stores data concerning a field of view and a magnification level for at least one class of components, and wherein the controller is operable to link, for the component on the object, the data from the input device representing the location of the component on the object with the data from the memory concerning the field of view and the magnification level for the at least one class of components to which the component belongs.

7. The device of claim 6, wherein the input device uses design data created to arrange the component on the object to supply the data representing the location of the component on the object and the class of components to which the component belongs.

8. The device of claim 6, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

9. A device for establishing viewing zones to be used to inspect the attachment of components arranged on the surface of an object, comprising:

a memory storing data concerning a field of view for at least one class of components and a table of correspondences that identifies a component on the object and provides data representing a class of components to which the component belongs;

an input device operable to supply, for the component on the object, data representing a location of the component on the object; and a controller operable to use the table of correspondences to identify the class of components to which the component on the object belongs, to link the data from the input device representing the location of the component on the object with the data from the memory concerning the field of view for the identified at least one class of components to which the component belongs, and to create at least one viewing zone on the surface of the object using the combined data for the component on the object.

10. The device of claim 9, wherein the input device uses design data created to arrange the component on the object to supply the data identifying the component and the data representing the location of the component on the object.

11. The device of claim 9, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

12. The device of claim 9, wherein the memory stores data concerning a field of view and a magnification level for the at least one class of components, and wherein the controller is operable to link, for the component on the object, the data from the input device representing the location of the component on the object with the data from the memory concerning the field of view and the magnification level for the at least one class of components to which the component belongs.

13. The device of claim 12, wherein the input device uses design data created to arrange the component on the object to supply the data representing the location of the component on the object and the at least one class of components to which the component belongs.

14. The device of claim 12, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

15. A method of inspecting the appearance of an object on whose surface are arranged components, comprising:

establishing data concerning a field of view for at least one class of components;

linking, for a component on the object, data representing the location of the component on the object with the data concerning the field of view previously established for the at least one class of components to which the component belongs;

creating at least one viewing zone on the surface of the object using the linked data for the component on the object;

capturing image data representative of portions of the object in the viewing zones; and analyzing the image data to determine whether components in the at least one viewing zone are properly attached to the object.

16. The method of claim 15, further comprising establishing data concerning a magnification level for the at least one class of components, wherein the step of linking comprises linking, for the component on the object, the data representing the location of the component on the object with the data concerning the field of view and the data concerning the magnification level previously established for the at least one class of components to which the component belongs, and wherein the step of capturing the image data comprises capturing the image data using a magnification level associated with a component located in the viewing zone.

17. A device for inspecting the appearance of an object on whose surface are arranged components, comprising:

an imaging device operable to capture an image of a portion of the object;

a memory storing data concerning a field of view for at least one class of components;

an input device operable to supply, for a component on the object, data representing a location of the component and a class of components to which the component belongs; and a controller operable to link, for the component on the object, the data from the input device representing the location of the component on the object with the data from the memory concerning the field of view for the at least one class of components to which the component belongs, to create at least one viewing zone on the surface of the object using the linked data for the component on the object, to control a position of the imaging device, and to cause the imaging device to successively capture data for each viewing zone.

18. The device of claim 17, wherein the input device uses design data created to arrange the component on the object to supply the data representing the location of the component and the class of components to which the component belongs.

19. The device of claim 17, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

20. The device of claim 17, wherein the memory stores data concerning a field of view and a magnification level for the at least one class of components, and wherein the controller is operable to link, for the component on the object, the data from the input device representing the location of the component on the object with the data from the memory concerning the field of view and the magnification level for the at least one class of components to which the component belongs.

21. The device of claim 20, wherein the input device uses design data created to arrange the component on the object to supply the data representing the location of the component on the object and the class of components to which the component belongs.

22. The device of claim 20, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

23. A device for inspecting the appearance of an object on whose surface are arranged components, comprising:

an imaging device operable to capture an image of a portion of the object;

a memory storing data concerning a field of view for at least one class of components and a table of correspondences that identifies a component on the object and provides data representing a class of components to which the component belongs;

an input device operable to supply, for the component on the object, data representing a location of the component on the object; and a controller operable to use the table of correspondences to identify the class of components to which the component on the object belongs, to link the data from the input device representing the location of the component on the object with the data from the memory concerning the field of view for the identified class of components to which the component belongs, to create at least one viewing zone on the surface of the object using the linked data for the component on the object, to control a position of the imaging device, and to cause the imaging device to successively capture data for each viewing zone using a magnification level associated with a component located in the viewing zone.

24. The device of claim 23, wherein the input device uses design data created to arrange the component on the object to supply the data representing the location of the component and the class of components to which the component belongs.

25. The device of claim 23, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

26. The device of claim 23, wherein the memory stores data concerning a field of view and a magnification level for the at least one class of components, and wherein the controller is operable to link, for the component on the object, the data from the input device representing the location of the component on the object with the data from the memory concerning the field of view and the magnification level for the at least one class of components to which the component belongs.

27. The device of claim 26, wherein the input device uses design data created to arrange the component or the object to supply the data representing the location of the component and the class of components to which the component belongs.

28. The device of claim 26, wherein the at least one viewing zone includes data representing multiple components on the object and wherein the controller adjusts a position of the at least one viewing zone so that a center point of the at least one viewing zone matches a center point of a rectangular region that encompasses the fields of view of all components included in the at least one viewing zone.

29. A device for inspecting the appearance of an object on whose surface are arranged components, comprising:

an imaging device operable to capture an image of a portion of the object;

a memory storing data concerning a field of view for at least one class of components;

an input device operable to supply, for a component on the object, data representing a location of the component and a class of components to which the component belongs;

a controller operable to link, for the component on the object, the data from the input device representing the location of the component on the object with the data from the memory concerning the field of view for the at least one class of components to which the component belongs, to create at least one viewing zone on the surface of the object using the linked data for the component on the object, to control a position of the imaging device, and to cause the imaging device to successively capture data for each viewing zone; and a display device operable to synthesize and display on the image data for each viewing zone separate image data indicative of the locations to be inspected in that viewing zone.

30. The device of claim 29, wherein the locations to be inspected in a viewing zone correspond only to components for which the entire fields of view of the components are contained in the viewing zone.

31. The device of claim 29, wherein the display device superimposes on the image data for the each viewing zone the image data to indicate the portions to be inspected on each component whose entire field of view lies in the end viewing zone and displays a portion of the image representing a component having a field of view that is only partly contained within a viewing zone using a different set of image data to indicate which portions of it are to be inspected.

32. The device of claim 31, wherein the display device displays at a uniform density the portion of the image representing a component having a field of view that is only partly contained in the viewing zone.

33. The device of claim 29, wherein the memory stores data concerning a field of view and a magnification level for the at least one class of components, and wherein the controller is operable to link, for the component on the object, the data from the input device representing the location of the component on the object with the data from the memory concerning the field of view and the magnification level for the at least one class of components to which the component belongs.

34. The device of claim 33, wherein the location to be inspected in a viewing zone correspond only to components for which the entire fields of view of the components are contained in the viewing zone.

35. The device of claim 33, wherein the display device superimposes on the image data for the each viewing the image data to indicate the portions to be inspected on each component whose entire field of view lies in the each viewing zone and displays a portion of the image representing a component having a field of view that is only partly contained within a viewing zone using a different set of image data to indicate which portions of it are to be inspected.

36. The device of claim 35, wherein the display device displays at a uniform density the portion of the image representing a component having a field of view that is only partly contained in the viewing zone.

* * * * *